United States Patent [19]

Okazaki et al.

[11] 4,262,353
[45] Apr. 14, 1981

[54] TRANSDUCER FOR ELECTRONIC TIMEPIECE

[75] Inventors: Sakiho Okazaki; Yoshikazu Kawamura, both of Suwa, Japan

[73] Assignee: Kabushiki Kaisha Suwa Seikosha, Tokyo, Japan

[21] Appl. No.: 940,229

[22] Filed: Sep. 7, 1978

[51] Int. Cl.³ ............................ G04F 5/00; G06F 1/04; H02K 37/00; H02K 19/00
[52] U.S. Cl. .................................. 368/157; 310/49 R; 310/162
[58] Field of Search ................. 310/49, 162, 163, 164; 148/31.57, 103; 58/23 D; 368/157

[56] References Cited

U.S. PATENT DOCUMENTS

| 3,878,414 | 4/1975 | Harakawa | 310/156 |
| 3,984,972 | 10/1976 | Yoshino | 58/23 D |

OTHER PUBLICATIONS

IEEE Transactions on Magnetics, vol. 13, No. 5, Sep. 1977.

Primary Examiner—J. V. Truhe
Assistant Examiner—John B. Conklin
Attorney, Agent, or Firm—Blum, Kaplan, Friedman, Silberman & Beran

[57] ABSTRACT

An improved electronic timepiece transducer wherein the construction of the permanent magnet rotor and a magnetic permeable stator effects a reduction in energy consumption during operation. In particular, the rotor is characterized by a predetermined thickness and at least two concentric circular equal radii surfaces having the same radius. Similarly, the stator includes highly permeable stator poles having a predetermined thickness and two symmetrical equal radii semi-circular stator surfaces having the same radius and surrounding the rotor. The ratio of the rotor radii to the stator radii and the ratio of the rotor thickness to the stator thickness define a specific relationship that effects a reduction in the energy consumed by the step motor during operation.

4 Claims, 11 Drawing Figures

TRANSDUCER FOR ELECTRONIC TIMEPIECE

BACKGROUND OF THE INVENTION

This invention is directed to a transducer for an electronic timepiece and, in particular, to a step motor for use in a quartz crystal electronic timepiece.

Two particular areas of emphasis that have dominated the development of electronic analog display timepieces, and in particular wristwatches, are the improvement of the timekeeping accuracy of the timepiece and a reduction in energy consumption of the timepiece. By utilizing high frequency quartz crystal vibrators as a time standard, the accuracy of the time kept by the electronic timepiece has been dramatically improved. Similarly, efforts have been made to reduce power consumption, so that the life of the battery can be extended in an electronic wristwatch and thereby reduce the frequency with which the battery needs to be replaced.

It is noted, however, that in electronic timepieces having an electro-mechanical transducer mechanism, such as a step motor, the power consumption of the transducer mechanism is considerable when compared with the power consumption of the remaining components of the electronic circuit, such as the oscillator circuit, divider circuit, etc. Accordingly, a lowering of the power consumption of the electro-mechanical transducer will substantially increase the life of the battery.

It is also noted that efforts have been made to improve electro-mechanical transducers in electronic timepieces by maximizing the torque generated thereby without providing an attendant increase in current consumption. An electro-mechanical transducer arrangement for achieving this type of result in an electronic wristwatch is detailed in U.S. Pat. No. 3,984,972, which patent is assigned to the same assignee herein. It is noted, however, that electro-mechanical transducer arrangements of the type set forth in U.S. Pat. No. 3,984,972, although providing a suitable increase in torque without an increase in current consumption and, hence, improved efficiency, have been unable to effect a reduction in the current consumption of the transducer to a level that would effect a substantial increase in the life of the battery utilized to drive the electronic timepiece.

SUMMARY OF THE INVENTION

Generally speaking, in accordance with the invention, an improved transducer for an electronic timepiece is provided. The transducer is a step motor having a permanent magnet rotor including two opposite polarity poles. The rotor is formed with respect to its mechanical axis to define at least two concentric circular equal radii surfaces having a radius $R_r$ and a thickness $R_t$. Two stator poles, formed of a highly permeable material, include a common coil wrapped therearound. The two stator poles have symmetrical equal radii semicircular stator surfaces having a thickness $S_t$ and a radius $S_r$. The stator poles surround the rotor. The ratio of the rotor radii $R_r$ to the stator radii $S_r$ and the ratio of the rotor thickness $R_t$ to the stator thickness $S_t$ define predetermined ranges of ratios that effect improved efficiency and a decrease in the energy consumed by the step motor transducer.

Accordingly, it is an object of the instant invention to provide an improved step motor transducer for use in an electronic timepiece.

A further object of this invention is to provide an improved step motor transducer for an electronic timepiece wherein a minimum amount of current is required to efficiently operate the step motor mechanism.

Still a further object of the instant invention is to provide a highly efficient step motor transducer for a quartz crystal timepiece.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 10:
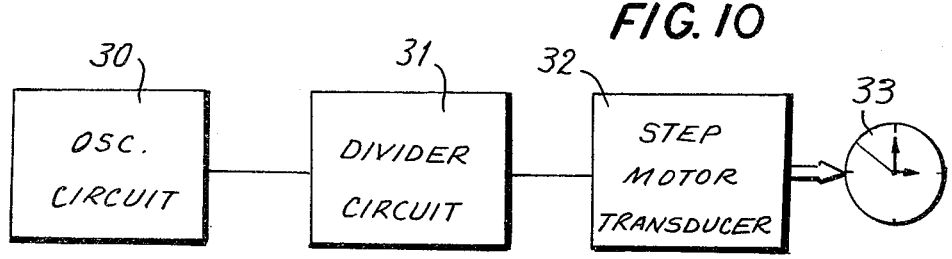
FIG. 10 is a block circuit diagram of an electronic wristwatch including the step motor transducer depicted in FIG. 1.

Reference is first made to FIG. 10, wherein an improved quartz crystal timepiece utilizing the step motor transducer of the instant invention is depicted. An oscillator circuit 30 produces a high frequency time standard signal in accordance with the frequency of vibration of a quartz crystal vibrator utilized as a time standard. The high frequency time standard signal is applied to a divider circuit 31 comprised of a plurality of series-connected divider stages adapted to produce a low frequency timekeeping signal having a period of two seconds. The low frequency timekeeping signal is applied to a drive coil of a step motor transducer 32 to thereby induce therein an opposite polarity drive pulse once each second. The step motor transducer 32, in response to the low frequency timekeeping signal applied thereto, effects a rotation of the display hands of analog display 33, in a conventional manner.

Figure 1:
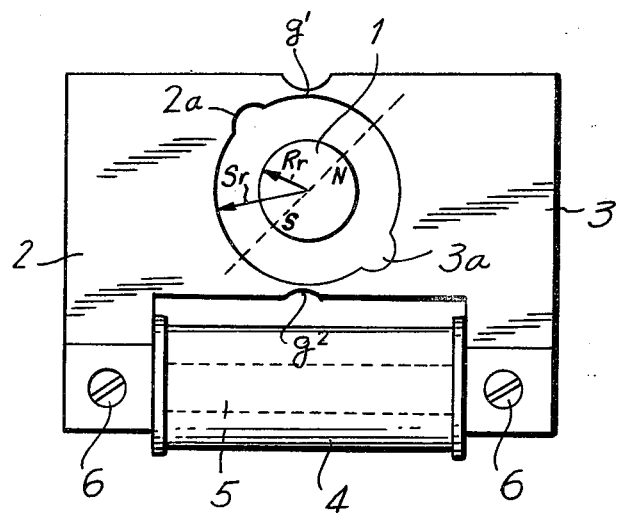
FIG. 1 is an elevational view of a two-pole step motor transducer for an electronic timepiece constructed in accordance with the instant invention.
Figure 2:
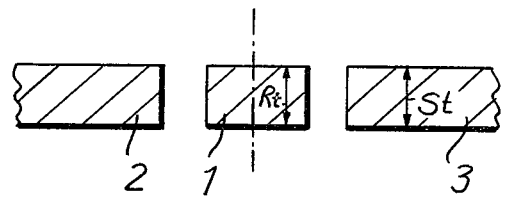
FIG. 2 is a partial sectional view of the step motor illustrated in FIG. 1.

Reference is now made to FIGS. 1 and 2, wherein a step motor transducer, constructed in accordance with the instant invention, is depicted. The step motor includes a cylindrical permanent magnet rotor 1 having two diametrically opposite polarity poles (N+S). The stator poles 2 and 3 are secured to a yoke 5 by screws 6. Yoke 5 includes a coil 4 wound therearound. The coil is adapted to receive the low frequency timekeeping signal produced by the divider circuit and, in response thereto, induce the drive signal illustrated in FIG. 3 therein. The stator poles 2 and 3 define symmetrical semi-circular equal radii surfaces 2b and 3b, respectively, surrounding the rotor 1. The stator poles 2 and 3 are formed in a unitary construction and are joined through thinned portion $g_1$ and $g_2$. Additionally, notches 2a and 3a are respectively disposed in stator poles 2 and 3 to effect an orientation of permanent magnet rotor 1 when same is disposed at a rest position. Moreover, by utilizing notches 2a and 3a to orient the rest position of permanent magnet rotor 1, the direction of rotation of the permanent magnet rotor 1 is assured. It is noted that the rest position of permanent magnet rotor 1 is defined by the broken line in FIG. 1.

Figure 3:
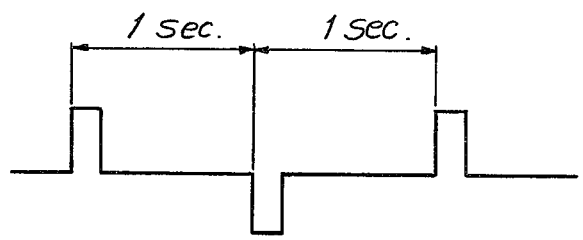
FIG. 3 is a wave diagram of a drive pulse applied to the step motor transducer depicted in FIG. 1 in order to effect rotation thereof.

As illustrated in FIG. 3, opposite polarity pulses are alternately applied through drive coil 4 once each second. In response to the opposite polarity pulses, applied to the drive coil 4, the stator poles 2 and 3 are alternately referenced to opposite polarities to effect a magnetic attraction and repulsion of the N and S poles of the permanent magnet rotor 1 and, hence, effect a rotation of the permanent magnet rotor 1 through 180° for each change of the polarity of stator poles 2 and 3 with respect to each other. Thus, the step motor is stepped through 180° in response to each alternate polarity pulse applied through drive coil 4 in the usual manner in order to obtain an efficient stepping of the motor.

It is noted, however, that conventional step motors of the type depicted in FIG. 1 have required the ratio of the rotor radius $R_r$ to the stator radius $S_r$ to be within the range of $0.6 \leq R_r/S_r \leq 0.9$, in order not to increase the power consumption of the step motor. This type of relationship between the stator radii and rotor radii is discussed in detail in U.S. Pat. No. 3,984,972, which patent is incorporated by reference as if fully set forth herein. Actual embodiments of step motors, made in accordance with the teachings of U.S. Pat. No. 3,984,972, have selected a step motor ratio of rotor radii to stator radii ($R_r/S_r$) within the range of 0.65 to 0.7. In such step motors, a rotor magnet having a maximum energy product of 10 to 15 MGOe was utilized to define the rotor magnet 1.

It is also noted that rare earth cobalt magnets, of the type utilized in step motor transducers, have had a maximum energy product (BH max.) on the order of 10 to 15 MGOe. However, new compositions have recently been developed having a higher permeability than rare earth cobalt magnets. One such type of composition is $Sm_2(Co, Fe, Cu, Cz)_{17}$. As a result of optimum agent treatments, percipitate-hardened five element magnets with extremely high performance, on the order of 30 MGOe, have been developed. Moreover, this type of magnet provides a substantial improvement in performance and is not limited by considerations such as cost, manufacturing conditions, and the like, and provides a magnet that is superior to conventional $SmCo_5$ magnets of the type previously used in conventional step motor transducers. It is noted that the instant invention is characterized by the use of such high performance magnets for use in the rotor assembly in order to obtain increased efficiency and reduced current consumption.

As aforenoted, the instant invention is characterized by the use of highly permeable magnets, thereby requiring a decrease in the diametric dimensions of the rotor. Thus, the ratio of the rotor radii to stator radii ($R_r/S_r$) is reduced to less than 0.6. By reducing the ratio of the radii of the rotor to the radii of the stator, the efficiency of the step motor transducer is improved and, at the same time, a considerable reduction in power consumption is obtained.

Figure 4:
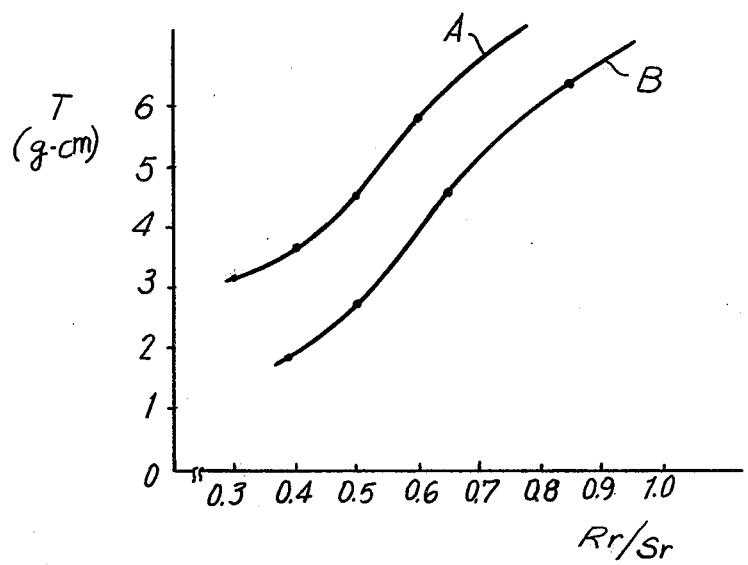
FIG. 4 is a graphical illustration of the relationship between the output torque required to rotate a minute hand of an electronic wristwatch and the ratio of the rotor radii to the stator radii of a step motor transducer.

It is noted that conventional step motors require the ratio of the rotor radii to the stator radii ($R_r/S_r$) to be greater than 0.6 in order to obtain a sufficient output torque, as is illustrated by curve B in FIG. 4. The output torque required to effect rotation of the minute hand, in a conventional analog display electronic wristwatch, is within the range of 3.5 to 4 g-cm and cannot be obtained unless the ratio of the rotor radii to the stator radii is 0.6 or greater. However, by utilizing a strong magnet (e.g. BH max.=20 to 30 MGO3), and by increasing the thickness of the rotor, a torque (T) rotor radii to stator radii ratio relationship, of the type illustrated by curve A in FIG. 4, can be obtained. As demonstrated by curve A in FIG. 4, by utilizing a strong magnet, of the type noted above, a ratio of the rotor to stator radii of less than 0.6 will provide a sufficient torque to drive the rotor. Moreover, if the ratio of the rotor radii to the stator radii is greater than 0.6, although a greater torque is obtained, a considerable and undesirable increase in the current consumed by the step motor also occurs.

Figure 5:
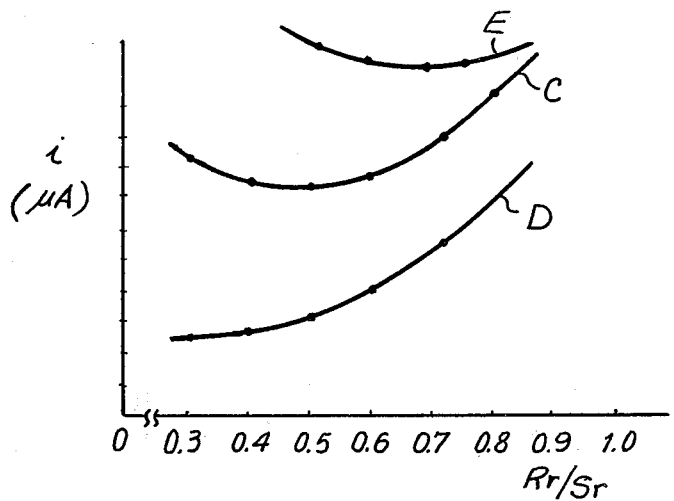
FIG. 5 is a graphical illustration of the relationship between the current consumption of a step motor transducer and the ratio of the rotor radii to the stator radii.

FIG. 5 illustrates the amount of current consumed as a result of changes in the rotor radii to the stator radii ratio. When a magnet, having a BH max.=30, a ratio $R_t/S_t=1.0$, and an adjustment of notches 2a and 3a to obtain an optimum result, curve C, in FIG. 5, illustrates the amount of current consumed when an output torque of 3.5 g-cm is generated. Curve C illustrates the reduction in current consumption when the ratio of rotor radii to stator radii $R_r/S_r$ is less than 0.6 and, in particular, that the least current consumption occurs when this ratio is in the range of 0.45 to 0.6. Since the notches 2a and 3a on the stator poles must be reduced in size if the ratio of $R_r/S_r$ is increased, the differences in the shape of the stator provide a great influence upon the performance of the step motor transducer. Specifically, the area of the notches is about 0.5% when compared with the area of the inner circle defined by stator radius $S_r$, so that a change in the shape of the notch changes the ratio of the notch area to the area of the inner radii of the stator. Curve C also demonstrates that an increase in current consumption is experienced when the ratio of the rotor radii to the stator radii is decreased to too great an extent. As illustrated in FIG. 5, the current required to drive the motor decreases until the ratio of the rotor radii to stator radii reaches 0.3 and once this ratio becomes less than 0.3, the starting current is increased in contrast to the decrease experienced at values greater than 0.3.

Curve D, in FIG. 5, illustrates the current consumed by a step motor transducer when the output torque is almost zero, i.e., the minimum current required to start the motor. The larger the ratio of $R_r/S_r$, the greater the increase in current consumption, particularly when $R_r/S_r$ increases to 0.6 to 0.7, after which an even greater increase in current consumption occurs. This result occurs because of the increase in the inertia of the rotor (the force of inertia is in proportion to the value obtained by raising the radius to the fourth power). Moreover, a large starting current is undesirable since it makes starting of the rotor less reliable, and thereby reduces the overall reliability of the motor. The difference between the starting current (no load) and the current required to provide a starting torque is small when an output torque of 3.5 g-cm is required to rotate the rotor. However, a large change of output torque, results from a small change in the voltage applied to the motor. For example, the output torque rapidly decreases when the battery voltage is decreased, possibly resulting in a stoppage of the rotor. Moreover, this provides a less than completely satisfactory result in a step motor construction, wherein the output energy is proportional to the load, and the motor is controlled by current pulses having a variable pulse width.

Figure 6:
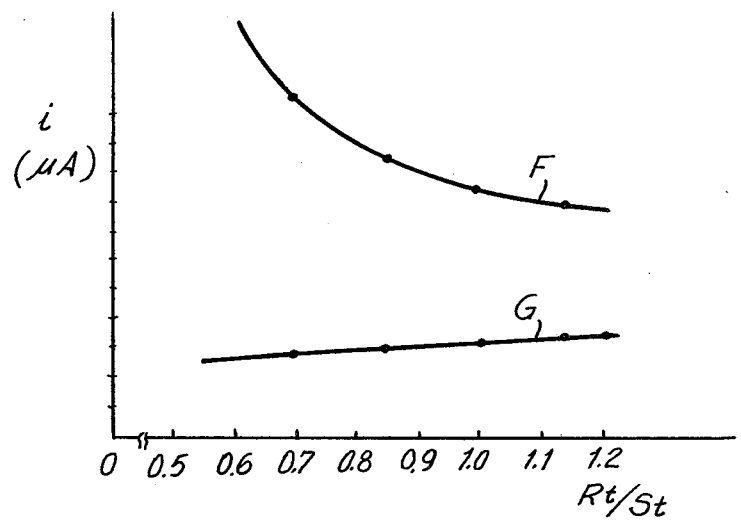
FIG. 6 is a graphical illustration of the relationship between the current consumption of a step motor transducer and the ratio of the rotor thickness to the stator thickness.

As detailed above, the instant invention is particularly characterized by the relationship between the thickness of the rotor, hereinafter $R_t$, and the thickness of the stator, hereinafter $S_t$ (FIG. 2). FIG. 6 illustrates measured values of current consumption when only the thickness of the rotor is varied without changing other conditions such as $R_r$, $S_r$, etc. Curve F in FIG. 6 illustrates the current consumed by a step motor when the output torque is 3.5 g-cm and curve G illustrates the minimum current required to start the motor. The smaller the ratio of $R_t/S_t$, the greater the increase in current consumption (curve F) when the output torque is maintained at 3.5 g-cm. This is particularly the case when $R_t/S_t$ is less than 0.8 and the current consumption is increased. It is noted, however, that curve G demonstrates that the starting current is further increased as the ratio $R_t/S_t$ increases, although such increase is gradual. Therefore, the thickness ratio of the rotor and stator, $R_t/S_t$ is put to good advantage, in the instant invention, by making same more than 0.8, thereby reducing the power consumption of the step motor transducer. Moreover, experiments have demonstrated that a maximum ratio of $R_t/S_t$ is 1.2. In a preferred embodiment, however, this value should not be increased to more than 1.5. Moreover, when utilized in electronic wristwatches wherein it is desired to keep the wristwatch thin, the maximum value of $R_t/S_t$ should be in the range of 1.2 to 1.25.

Thus by utilizing a motor having the dimensional requirement of the instant invention ($R_r/S_r \leq 0.6$, $R_t/S_t = 0.7$ to 0.8 & BH max. of magnet = 10 to 15), a decrease in power consumption on the order of 15 to 20% is obtained over conventional step motors of the type detailed above. For example, the current consumption of a conventional step motor transducer, when the output torque is 3.5 g-cm, is illustrated by curve E in FIG. 5. In conventional step motors, the current consumption of the step motor was not usually reduced to less than 1 $\mu$A. However, a step motor transducer, constructed in accordance with the instant invention, can provide a current consumption of 0.8 $\mu$A or less and yet, can provide the same output torque as the conventional step motor transducers of the type noted above.

Figure 7A:
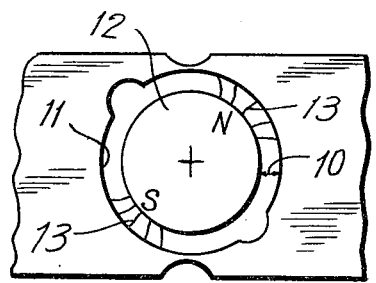
FIG. 7a is an elevational view of the manner in which torque is distributed in a conventional step motor transducer during operation.
Figure 7B:
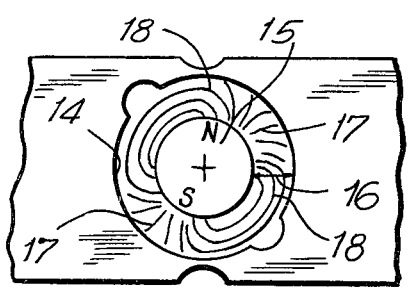
FIG. 7b is an elevational view of the manner in which torque is distributed in a step motor construction in accordance with the instant invention during operation.

The difference in flux distribution between a conventional step motor transducer and a step motor transducer, of the type to which the instant invention is directed, is illustrated in FIGS. 7a and 7b. A conventional step motor transducer construction is illustrated in FIG. 7a. In particular, the outer diameter of the rotor 12 approximates the inner diameter of the stator 11 so that the gap 10 between the rotor 12 and stator 11 is small. In contrast thereto, the step motor transducer of the instant invention, illustrated in FIG. 7b, shows a large difference between the inner diameter of the stator 14 and the outer diameter of the rotor 15 so that a large gap 16 is provided between the inner diameter of the stator and the outer diameter of the rotor, which gap is considerable when compared to the smaller gap in the conventional step motor transducer, depicted in FIG. 7a. It is noted that the instant invention obtains improved efficiency, notwithstanding an increase in the size of the gap between the rotor and the stator. It therefore appears that the increased efficiency obtained by the step motor transducers of the instant invention occurs for two reasons. The first reason is that although the inner diameter of the stator is the same as it is in a conventional motor, the diameter of the rotor is decreased thereby effecting a reduction in the inertia of the rotor. If the inertia of the rotor is decreased, the inertia losses during rotation are reduced, thereby improving the efficiency of the step motor. The second reason for the improved efficiency is based on the magnetic flux distribution between the rotor poles and the stator poles. As a general principal, the greater the entire amount of magnetic flux, the larger the amount of output torque of the motor that will be produced. However, as the magnetic flux increases, stronger magnetic attractive forces between the rotor and stator are produced resulting in a further increase in current consumption, since the rotor must be driven a sufficient amount to overcome the attractive forces. Since the magnetic attractive forces influence the stability of the motor, when same is at rest, they cannot be reduced to any greater extent. Therefore, the step motor transducer should be designed to maintain the magnetic attractive forces between the stator and rotor at a constant level.

With specific reference to FIG. 7a, the gap 10 between the rotor 12 and the stator 11 is negligible, and as a result thereof, the magnetic flux 13 acts as a magnetic attractive force between the stator and the rotor. On the other hand, in the step motor construction, illustrated in FIG. 7b, the gap 16 between the rotor 15 and stator 14 is considerable and, hence, the magnetic flux is split into two components, magnetic flux 17 providing an attractive force and magnetic flux 18, which flux is defined within the rotor entirely. Moreover, the magnetic flux 18, defined entirely within the rotor, is the more substantial portion of flux generated when compared with the magnetic flux 17 defining magnetic attractive forces. Thus, if the entire magnetic flux generated by the rotor is the same in FIGS. 7a and 7b, it is clear that the amount of magnetic flux attractive forces generated in the step motor, illustrated in FIG. 7b, is considerably less than the flux generated in the conventional step motor, illustrated in FIG. 7b. If the same amount of driving force is provided for both step motors, a larger torque will be applied to the step motor in FIG. 7b, in view of the reduction in the attractive forces between the stator and rotor. Alternatively, if both motors are driven to produce the same output torque, the step motor transducer of the instant invention requires less power in order to effect driving of same, and hence improved efficiency is obtained.

Figure 8:
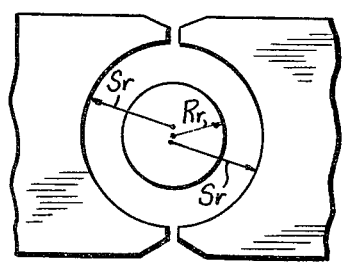
FIG. 8 is an elevational view of a step motor transducer constructed in accordance with a further embodiment of the instant invention.
Figure 9:
FIG. 9 is an elevational view of a different rotor configuration adapted for use in accordance with the instant invention.

An exemplary embodiment of the instant invention has been detailed above. However, the instant invention is not limited to the embodiments detailed above and can be changed in several respects. For example, stator poles 2 and 3 need not be unitary and, instead, can be separated at the reduced portions $g_1$ and $g_2$. Alternatively, a stator having the construction illustrated in FIG. 8 can be utilized. Finally, in lieu of a cylindrical rotor, a rotor having two concentric arced surfaces and two flat surfaces, of the type depicted in FIG. 9, can be utilized in a step motor transducer of the type to which the instant invention is directed.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanhing drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A step motor transducer particularly suited for use in electronic timepieces comprising in combination a permanent magnet rotor having two opposite polarity poles, said rotor having a thickness ($R_t$) and being formed with respect to said mechanical axis to define at least two concentric circular equal radii surfaces having a radius (Rr), said permanent magnet rotor being formed of a permanent magnet material having a maximum energy product of at least 20 MGOe, and a stator means including stator poles formed of a highly permeable material and having a thickness ($S_t$), said stator poles having a common coil wrapped therearound and defining two symmetrical equal radii semi-circular stator surfaces having a radius ($S_r$) surrounding said rotor, the ratio of said rotor radii to said stator radii ($R_r/S_r$) being within a range that is less than 0.6 and greater than 0.3, and the ratio of said rotor thickness to said stator thickness ($R_t/S_t$) having a range of 1.5 to 0.8.

2. A step motor transducer as claimed in claim 1, wherein said permanent magnet rotor is comprised of at least Sm, Co, Fe, Cu and Zr.

3. An electronic timepiece comprising an oscillator circuit adapted to produce a high frequency time standard signal, divider means adapted to produce a low frequency drive signal in response to said high frequency time standard signal applied thereto, and a step motor transducer including a permanent magnet rotor having two opposite polarity poles, said rotor being formed with respect to said mechanical axis to define at least two concentric circular arc equal radii surfaces having a predetermined radius ($R_r$) and said rotor being formed of a permanent magnet material having a maximum energy product of at least 30 MGOe, and stator means including two stator poles having a common coil wrapped therearound, said common coil being adapted to receive said timekeeping signal produced by said divider means, each said stator pole having an equal radii ($S_r$) semi-circular stator surface surrounding said rotor, the ratio of said rotor radius to said stator radii being within the range that is less than 0.6 and greater than 0.3, said stator poles have a predetermined thickness ($S_t$) and said rotor has a thickness ($R_t$) that is predetermined with respect to the thickness of said stator poles to define a ratio of rotor thickness to stator thickness ($R_t/S_t$) in the range of 1.5 to 0.8.

4. An electronic timepiece as claimed in claim 3, wherein said permanent magnet rotor has the following composition:

$Sm_2(Co, Fe, Cu, Zr)_{17}$.

* * * * *